Jan. 5, 1926. 1,568,578
W. L. WEEKS
REVERSE GEAR AND CLUTCH OPERATING MECHANISM
Filed May 6, 1925
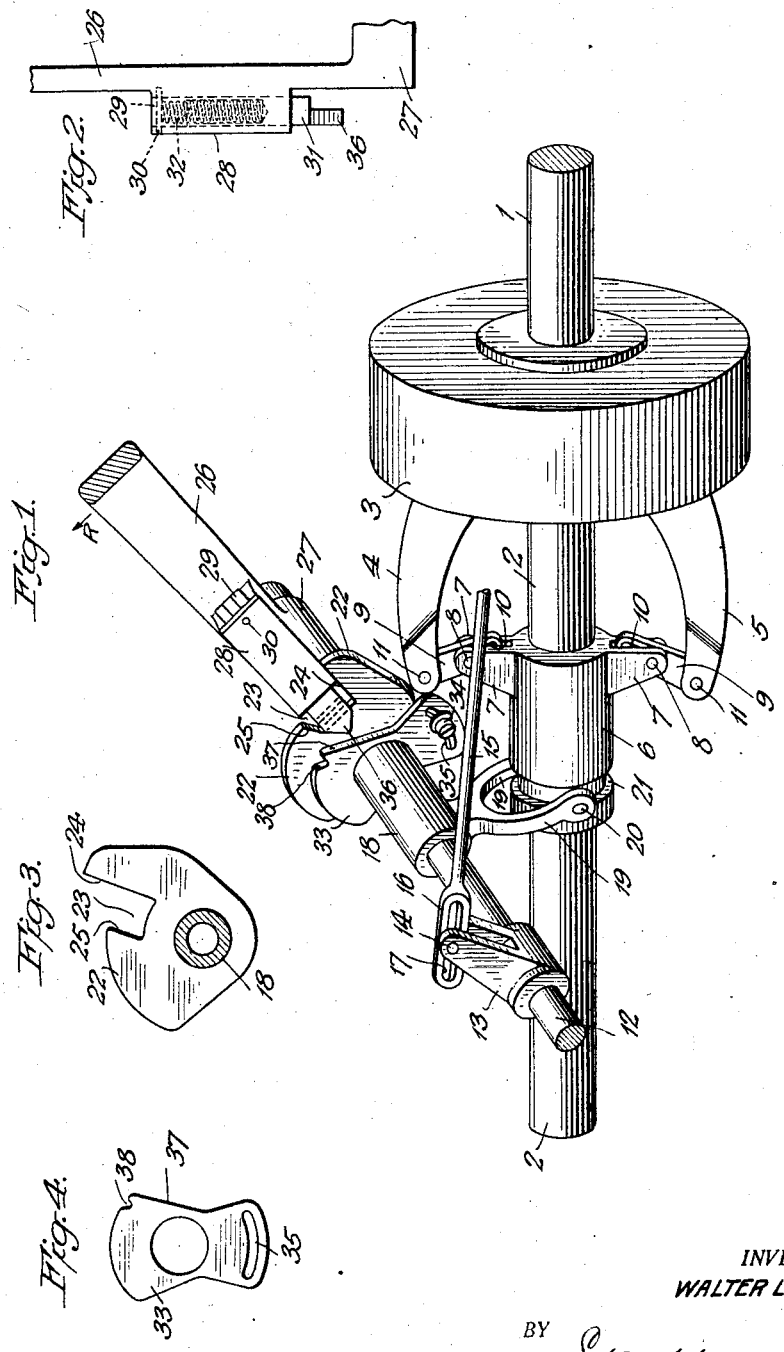
INVENTOR.
WALTER L. WEEKS.
BY *Stockbridge & Bros*
ATTORNEYS.

Patented Jan. 5, 1926.

1,568,578

UNITED STATES PATENT OFFICE.

WALTER L. WEEKS, OF PATERSON, NEW JERSEY, ASSIGNOR TO WRIGHT AERONAUTICAL CORPORATION, A CORPORATION OF NEW YORK.

REVERSE GEAR AND CLUTCH OPERATING MECHANISM.

Application filed May 6, 1925. Serial No. 28,364.

*To all whom it may concern:*

Be it known that I, WALTER L. WEEKS, a citizen of the United States, residing at Paterson, in the county of Passaic and State of New Jersey, have invented certain new and useful Improvements in Reverse Gear and Clutch Operating Mechanism, of which the following is a full, clear, and exact description.

This invention relates to the operation and control of clutches and reverse gears, such as are commonly employed, for example, in motor boats for connecting the engines to the propeller.

An object of the invention is to provide an improved mechanism for this purpose which will have the advantage of a single controlling or operating member for both the clutch and reverse gear; which will operate said clutch or the reverse gear, depending upon the selective position in which the common operating member is placed; with which a large amount of travel will be provided for the clutch operating mechanism and the reverse gear controlling mechanism without mutual interference; which will provide a neutral position for the common controlling or operating member, in which neutral position neither clutch nor reverse gear will be effective; with which the clutch will be positively operated into both clutched and unclutched conditions without the use of return springs; and which will be relatively simple, practical, compact, convenient, and relatively inexpensive.

Various other objects and advantages will be apparent from the following description of one embodiment of the invention, and the novel features will be particularly pointed out hereinafter in connection with the appended claims.

In the accompanying drawings:—

Fig. 1 is a perspective view of a clutch, a reverse gear operating or controlling member, and common controlling and operating means for the same, and illustrating one embodiment of the invention;

Fig. 2 is a side elevation of the operating handle of the same, with the latch device carried thereby;

Fig. 3 is a sectional elevation of the clutch operating sleeve; and

Fig. 4 is a side elevation of the cam for disconnecting the common operating handle from the clutch operating sleeve.

In the illustrated embodiment of the invention, the driving shaft 1 is arranged for coupling to a driven shaft 2 by suitable clutch mechanism partially concealed within a cylindrical enlargement 3 of the driving shaft 1. The clutch mechanism within the cylindrical enlargement 3 may be of any suitable construction, such as the type employing a stack of clutch plates alternately keyed to the driving and driven shafts and compressible together to frictionally couple them upon movement of the clutch arms 4 and 5 in a direction away from the driven shaft 2.

The sleeve 6, slidable along the driven shaft, is provided with ears 7 carrying pivot pins 8, which are pivotally connected to links 9, the pins 8 passing through slots 10 in the links 9 which are elongated in a direction lengthwise of the links. The links 9 are connected by pivot pins 11 to the arms 4 and 5. In Fig. 1, the sleeve 6 is shown in the position in which it holds the arms 4 and 5 in their outermost position and pressing the clutch plates (not shown) together to effect a coupling between the driving and driven shafts.

An operating shaft 12 is disposed transversely of the driven shaft 2 and above the same, and carries fixed thereon an operating arm 13 having a forked end carrying a pivot pin 14. A rod 15 is enlarged at one end, as at 16, and provided in such enlarged end with a slot 17 elongated in a direction lengthwise thereof, said enlargement 16 of the rod 15 being disposed in the forked end of the arm 13 with the pivot pin 14 passing through the slot 17 so as to provide a lost motion operating connection between the shaft 12 and the rod 15. The rod 15 is connected to a reverse gear (not shown) so as to operate or control the same whenever the rod 15 is pulled rearwardly, that is, to the left in Fig. 1. This reverse gear is not illustrated as, per se, it forms no part of the present invention. The rod 15, however, constitutes an operating or controlling element for the reverse gear.

A sleeve 18 is rotatably mounted upon the shaft 12 and carries fork arms 19 depending therefrom in embracing relation with the sleeve 6 which slides upon the shaft 2. Pins 20 in the ends of the arms 19 run in an annular groove 21 formed in the periphery of the sleeve 6, so that the sleeve 6 may rotate with the shaft 2 without disconnection or interference from the arms 19. However, when the sleeve 18 is rotated or oscillated upon the shaft 12, the arms 19 and pins 20 thereof will shift the sleeve 6 endwise along the shaft 2 without interfering with its rotation with the shaft.

The sleeve 18 is provided at one end with a flange 22 having in its periphery a notch 23, one wall 24 of the notch being longer than the opposite side wall 25 of the same notch. The periphery of the flange for some distance from the outer end of the shorter wall 25 of the notch is substantially concentric with the body of the sleeve 18.

A handle 26 is provided at one end with a boss 27 which receives the shaft 12, the boss 27 being secured to the shaft for rotation therewith in any suitable manner, not shown. The handle, therefore, serves as the medium by which the shaft 12 may be oscillated to perform the various functions which will be hereinafter described. The handle 26 is provided upon one side face with a tubular projecting portion or housing 28, open at its upper and lower ends, the upper end being closed by a block 29 which is secured therein by any suitable means, such as by a pin 30 which passes across the housing and engages in a notch in the upper end of the block 29.

A latch or device 31 is mounted for reciprocation in the housing 28 into and out of the lower end thereof, and a compression spring 32 (see Fig. 2) is interposed between the block 29 and the inner end of the latch element 31, so as to yieldingly resist the inward movement of the latch element 31. Preferably, the inner end of the latch element is recessed, and the spring 32 extends into the recess so that a relatively long compression spring may be employed without unduly lengthening the housing 28 or unduly shortening the latch element 31. The latch element is positioned to ride upon the periphery of the flange 22 and snap into the notch 23 when moved into alignment therewith as shown in Fig. 1.

When the latch element is within the notch 23 of the flange 22, the handle 26 will be coupled to the sleeve 18, so that when the handle is oscillated the sleeve 18 will be correspondingly oscillated and through the oscillation of the latter, the clutch mechanism will be operated.

A relatively stationary cam 33 is rotatably mounted upon the sleeve 18 adjacent the flange 22. The cam 33 is normally held against movement with the sleeve 18 in any suitable manner, but is preferably adjustable angularly upon the sleeve 18 for a purpose which will appear shortly. Preferably a bolt or screw 34 is passed through an arcuate slot 35 in the cam and into a suitable boss on the reverse gear housing (not shown). When the bolt or screw 34 is tightened, the cam will be clamped in the angular position to which it has been adjusted when the screw was loosened. The arcuate slot 34 permits of a limited angular adjustment of the cam which will be sufficient for the purpose.

The latch element 31 is provided at its lower end with a tapered extension 36 which passes at one side of the flange 22 and within the plane of the cam 33. The cam 33 is provided with an inclined cam surface 37 on which the extension 36 of the latch element will ride when the latch element is carried angularly with the handle 26. When the handle 26 is moved in the direction indicated by the arrow R in Fig. 1, it will oscillate the flange 22 and the sleeve 18, since the latch element is engaged in the notch 23 thereof, and this movement will continue until the extension 36 of the latch element engages with the relatively stationary cam surface 37.

Continued movement in the same direction will cause the latch element extension 36 to ride up the cam surface 37 and, therefore, the latch element will be elevated or forced into the housing 28. As the latch element is elevated, it will be disengaged from the notch 23 and thereupon the handle 26 will continue its angular movement without the flange 22 and the sleeve 18, the extension 36 during this time passing along another section of the periphery of the cam 33 which is substantially concentric with the sleeve 18.

The stationary cam 33 may have in its periphery at or adjacent the high end of the inclined surface 37 a V-shaped depression or notch 38 into which the tapered extension 36 of the latch element may snap to hold the handle 26 yieldingly in a neutral or intermediate position just after disconnection from the flange 22 of the sleeve 18.

In considering the operation of this embodiment of the invention, it will be noted that the parts are shown in Fig. 1 in the relative positions in which the clutch is operative to couple the driving and driven shafts, and the reverse gear is inactive. When the handle 26 is moved in the direction of the arrow R, the latch element 31 will engage with the shorter wall 25 of the notch 23, and rock the flange 22 and sleeve 18 in a counterclockwise direction (Fig. 1), during which movement, the fork arms 19 and pins 20 will shift the sleeve 6 toward the cylindrical section 3 of the driving shaft, and the sleeve 6 moving in this direction will allow the arms 4 and 5 of the clutch mechanism to move toward one another and release the pressure between the clutch plates, thus effecting a disconnection of the driving connection between the shafts 1 and 2.

During this release of the clutch, the extension 36 of the latch element is slowly riding up the inclined cam surface 37, and at the point where the clutch is completely disengaged or released, the latch element has been raised out of the notch 23 so that it may pass over the peripheral edge of the flange 22 during continued further angular movement. During a slight further movement, the extension 36 of the latch element will drop into the notch 38 of the stationary cam, and by engagement in the notch, the handle 26 will be yieldingly held in a neutral or intermediate position in which the clutch is in disengaged condition.

During the movement of the handle 26 up to this time, the pin 14 of the arm 13 has been moving rearwardly in the elongated slot 17 at one end of the rod 15 which operates the reverse gear, and when the handle 26 has moved until the latch element has engaged the notch 38 and the handle has been disengaged from the clutch mechanism, the pin 14 has closely approached or approximately reached the end of the slot 17. At this time, the handle in its neutral position is neither operating the reverse gear or the clutch.

Upon further movement of the handle 26 in the same direction, the latch element will be held upwardly by the stationary cam or by its engagement with the peripheral flange 22, but since the handle is now disconnected from the clutch no change in the condition of the latter will occur. The pin 14 of the arm 13, however, will pull the rod 15 and operate the reverse gear in a manner well understood in the art, particularly in marine installations.

When the reverse gear is to be released, the operating handle 26 is shifted in a reverse direction, that is, counter to the arrow R, during which movement a spring (not shown) in the reverse gear mechanism moves the rod 15 in a direction to release the reverse gear. This release occurs just prior to the instant at which the handle reaches the neutral position in which the extension 36 of the latch element engages in the notch 38 of the stationary cam. In this neutral position, neither clutch nor reverse gear is active or in operation.

If now the handle 26 is moved further in the same direction, the pin 14 of the arm 13 will move along the slot 17 and be inactive upon the reverse gear operating or controlling element 15, but during this movement the extension 36 of the latch element rides down the inclined cam surface 37 and allows the latch element to drop into the notch 23 under the action of the compressed spring 32. At this time the latch element or the housing 28 will engage with the longer side wall 24 of the notch 23, and will shift the flange 22 angularly in the same direction in which the handle is moving. The sleeve 18 which carries the flange will rock in the same angular direction, and the fork arms depending therefrom will shift the sleeve 6 along the shaft 2. The sleeve 6 in this movement will act through the links 9 to force the clutch arms 4 and 5 away from the shaft 2 and compress the plates of the clutch and again couple the driving and driven shafts, which relative condition of parts is shown in Fig. 1.

By loosening the screw or bolt 34, the relatively stationary cam 33 may be shifted angularly upon the sleeve 18 to a limited extent permitted by the arcuate slot 35 and secured in such adjusted position by a tightening of the screw or bolt 34. This limited angular change in the cam will move the cam surface 37 and notch 38 slightly in either direction to vary the instant of disconnection between the handle and the clutch operating means. The elongated slots 10 in the links 9 permit of a slight amount of lost motion of the sleeve 6 during the clutch releasing movement wherever additional movement of the sleeve 6 is desired.

It will be noted that with this construction, the common operating lever 26 fully releases the clutch before it operates the reverse gear, and that it may have a neutral or intermediate position in which the clutch is inactive and the reverse gear is not operated. It will also be noted that the construction provides for a positive movement of the clutch to both "in" and "out" conditions without dependence upon return springs. Thus a single common control is advantageously provided for both the clutch and reverse gear.

It will be obvious that various changes in the details, which have been herein described and illustrated for the purpose of explaining the nature of the invention, may be made by those skilled in the art within the principle and scope of the invention, as expressed in the appended claims.

I claim:—

1. In a reverse gear and clutch device, an oscillating element connected to and operating said clutch device and having a notch therein, a second element for controlling said reverse gear, a common operating element oscillatable about the axis of oscillation of said first element and having a latch engageable with said notch, whereby said first element and common element may be coupled for concomitant oscillation or uncoupled, a relatively stationary cam disposed in the path of travel of said latch for disengaging the latch from said first element when said common element is shifted in an unclutching direction beyond a desired extent, said second element having an abutment in the path of and engaged by said common element when the latter is moved further in an unclutching direction after being uncoupled from said first element, whereby said second element may be operated independently of the first element.

2. In a reverse gear and clutch device, an oscillating element connected to and operating said clutch device and having a notch therein, a second element for controlling said reverse gear, a common operating element oscillatable about the axis of oscillation of said first element and having a latch engageable with said notch, whereby said first element and common element may be coupled for concomitant oscillation or uncoupled, a relatively stationary cam disposed in the path of travel of said latch for disengaging the latch from said first element when said common element is shifted in an unclutching direction beyond a desired extent, said second element having an abutment in the path of and engaged by said common element when the latter is moved further in an unclutching direction after being uncoupled from said first element, whereby said second element may be operated independently of the first element, said relatively stationary cam having a notch therein into which the latch engages after being uncoupled from said first element and before engagement with said abutment, whereby said common element will be held in a neutral position by said stationary cam.

3. In a reverse gear and clutch device, an oscillating clutch operating element, a reverse gear controlling element, said oscillating element having a notch in its peripheral surface, a common operating element oscillating about the same axis and having a latch spring pressed against the periphery of said oscillating element so as to automatically snap into said notch when moved into alignment therewith, a connection between said common element and said reverse gear controlling element, and a relatively stationary cam disposed in the path of said latch for disengaging the latch from said notch and thereby said common element from said oscillating element when the common element has moved said oscillating element in an unclutching direction beyond a desired extent, whereby said common element may be operated further in the same direction to effect an operation of the reverse gear controlling element.

4. In a reverse gear and clutch device, an oscillating clutch operating element, a reverse gear controlling element, said oscillating element having a notch in its peripheral surface, a common operating element oscillating about the same axis and having a latch spring pressed against the periphery of said oscillating element so as to automatically snap into said notch when moved into alignment therewith, a connection between said common element and said reverse gear controlling element, and a relatively stationary cam disposed in the path of said latch for disengaging the latch from said notch and thereby said common element from said oscillating element when the common element has moved said oscillating element in an unclutching direction beyond a desired extent, whereby said common element may be operated further in the same direction to effect an operation of the reverse gear controlling element, said cam being adjustable in the path of said latch to vary the point of disconnection of the latch from the clutch operating element.

5. In a reverse gear and clutch device, an oscillating clutch operating element, a reverse gear controlling element, said oscillating element having a notch in its peripheral surface, a common operating element oscillating about the same axis and having a latch spring pressed against the periphery of said oscillating element so as to automatically snap into said notch when moved into alignment therewith, a connection between said common element and said reverse gear controlling element, and a relatively stationary cam disposed in the path of said latch for disengaging the latch from said notch and thereby said common element from said oscillating element when the common element has moved said oscillating element in an unclutching direction beyond a desired extent, whereby said common element may be operated further in the same direction to effect an operation of the reverse gear controlling element, said clutch operating element having an abutment within the path of the common element for preventing movement thereof in a clutching direction sufficiently to carry the latch beyond the notch.

6. In a reverse gear and clutch device, an oscillating element connected to and operating said clutch device and having a notch therein, a second element for controlling said reverse gear, a common operating element oscillatable about the axis of oscillation of said first element and having a latch engageable with said notch, whereby said first element and common element may be coupled for concomitant oscillation or uncoupled, a relatively stationary cam disposed in the path of travel of said latch for disengaging the latch from said first element when said common element is shifted in an unclutching direction beyond a desired extent, said second element having an abutment in the path of and engaged by said common element when the latter is moved further in an unclutching direction after being uncoupled from said first element, whereby said second element may be operated independently of the first element, said relatively stationary cam having a V-shaped notch in the path of said latch, and said latch having a V-shaped nose engageable in said V-shaped notch immediately upon the disengagement of said latch from the first element, whereby said common element will be yieldingly held in neutral position.

7. In a reverse gear and clutch device, an oscillating clutch operating element, an operating member oscillatable about the axis of oscillation of said element, a second element for controlling said reverse gear connected for operation by said member, said member and oscillating element having a relative latch and notch engagement with one another, whereby they may be oscillated together or separately, and a relatively stationary cam disposed in the path of said latch for disengaging it upon movement of said member beyond a desired extent in an unclutching direction, whereby said second element may be operated independently of the oscillating element upon further movement of said member in an unclutching direction.

8. In a reverse gear and clutch device, an oscillating clutch operating element, an operating member oscillatable about the axis of oscillation of said element, a second element for controlling said reverse gear connected for operation by said member, said member and oscillating element having a relative latch and notch engagement with one another, whereby they may be oscillated together or separately, and a relatively stationary cam disposed in the path of said latch for disengaging it upon movement of said member beyond a desired extent in an unclutching direction, whereby said second element may be operated independently of the oscillating element upon further movement of said member in an unclutching direction, said relatively stationary cam being adjustable along the path of travel of said latch to determine the point of its disconnection.

9. In a reverse gear and clutch device, a clutch, a reverse gear controlling element, a shaft, an arm on said shaft connected to said reverse gear controlling element, an operating handle for said shaft, means for operating said clutch, a latch device carried by said handle and engageable with said means to effect their concomitant operation, and means whereby said latch may be disengaged to permit operation of the reverse gear controlling element independently of the clutch.

10. In a reverse gear and clutch device, a clutch, a reverse gear controlling element, a shaft, an arm on said shaft connected to said reverse gear controlling element, an operating handle for said shaft, means for operating said clutch, a latch device carried by said handle and engageable with said means to effect their concomitant operation, and a relatively stationary cam disposed in the path of travel of said latch for automatically disengaging it from said means, when the handle has been shifted in an unclutching direction beyond a desired extent, whereby operation of said reverse gear controlling element by said handle during further movement of the latter in an unclutching direction may be permitted without operation of the clutch.

11. In a reverse gear and clutch device, a clutch, a reverse gear controlling element, a common operating member having a lost motion connection to said reverse gear controlling element, means for operating said clutch mechanism, a coupling device connecting said common operating member and said means, whereby said means may be operated by the common operating member during a section of its movement when by reason of the lost motion connection, it is ineffective upon the reverse gear controlling element, and a cam effective upon said coupling device for disconnecting said common operating member automatically from said means during the section of movement of said common operating member in which it is effective upon said reverse gear controlling element.

12. In a reverse gear and clutch device, a clutch, a reverse gear controlling element, a common operating member having a lost motion connection to said reverse gear controlling element, means for operating said clutch, a coupling device for connecting said common operating member and said means, whereby said means may be operated by the common operating member during a section of its movement when by reason of the lost motion connection, it is ineffective upon the reverse gear controlling element, and a cam effective upon said coupling device for disconnecting said common operating member from said means during the section of movement of said common operating member in which it is effective upon said reverse gear controlling element, said cam being adjustable to vary the relative instant of disconnection between said means and the common operating member.

13. In a reverse gear and clutch device, a clutch, a reverse gear controlling element, a shaft, an arm on said shaft having a lost motion connection to said reverse gear controlling element, an operating handle for said shaft, means for operating said clutch, a latch device carried by said handle for coupling it to said means, whereby when said handle moves through one angular section of movement in which the shaft will be ineffective upon the reverse gear controlling element by reason of the said lost motion connection, said means will be effective to operate the clutch, and whereby the handle may be disconnected from said means throughout the portion of its angular movement in which said arm is effective upon said reverse gear controlling element.

14. In a reverse gear and clutch device, a clutch, a reverse gear controlling element, a shaft, an arm on said shaft having a lost motion connection to said reverse gear controlling element, an operating handle for said shaft, means for operating said clutch, a latch device carried by said handle for coupling it to said means, whereby when said handle moves through one angular section of its movement in which the shaft will be ineffective upon the reverse gear controlling element by reason of the lost motion connection, said means will be effective to operate the clutch, and whereby the latch device may be disconnected from said means throughout the portion of angular movement of said handle in which said arm is effective upon said reverse gear controlling element, and means for disconnecting the latch device from said means automatically before said arm becomes effective upon said reverse gear controlling element, and automatically reconnecting it to said means when said arm is ineffective upon said reverse gear controlling element.

15. In a reverse gear and clutch device, a clutch, a reverse gear controlling element, a shaft, an arm on said shaft having a lost motion connection to said reverse gear controlling element, an operating handle for said shaft, means for operating said clutch, a latch device carried by said handle for coupling it to said means, whereby when said handle moves through one angular section of its movement in which the shaft will be ineffective upon the reverse gear controlling element by reason of the lost motion connection, said means will be effective to operate said clutch, and whereby the handle may be disconnected from said means throughout the portion of its angular movement in which said arm is effective upon said reverse gear controlling element, and a relatively stationary cam for operating said latch device out of coupling relation with said means as the handle approaches the angular position in which said arm becomes effective upon said reverse gear controlling element.

16. In a reverse gear and clutch device, a clutch, a reverse gear controlling element, a shaft, an arm on said shaft having a lost motion connection to said reverse gear controlling element, a sleeve rotatable upon said shaft and connected to said clutch for operation of the latter, said sleeve having a flange with a notch in its periphery, a handle and engageable in said notch to couple the sleeve to said handle, whereby operation of said handle will operate said sleeve and clutch while ineffective upon the reverse gear controlling element by reason of said lost motion connection, and whereby said handle may be disconnected from said sleeve by removal of the latch from said flange notch when operation of said reverse gear controlling element by said handle is desired.

17. In a reverse gear and clutch device, a clutch, a reverse gear controlling element, a shaft, an arm on said shaft having a lost motion connection to said reverse gear controlling element, a sleeve rotatable on said shaft and connected to said clutch for operation of the latter, said sleeve having a flange with a notch therein, a handle carried by said shaft, a latch carried by said handle and engageable in said notch to couple the sleeve to said handle, whereby operation of said handle may operate said sleeve and clutch while ineffective upon the reverse gear controlling element by reason of said lost motion connection thereto, and whereby said handle may be disconnected from said sleeve when operation of said reverse gear controlling element is desired, and a relatively stationary cam acting automatically upon said latch to force it from said notch and disconnect the handle from said sleeve as the handle approaches the angular position in which said shaft becomes effective upon the reverse gear controlling element.

18. In a reverse gear and clutch device, a clutch, a reverse gear controlling element, a shaft, an arm on said shaft having a lost motion connection to said reverse gear controlling element, a sleeve rotatable on said shaft and connected to said clutch for operation of the latter, said sleeve having a flange with a notch therein, a handle carried by said shaft, a latch carried by said handle and engageable in said notch to couple the sleeve to said handle, whereby operation of said handle may operate said sleeve and clutch while ineffective upon the reverse gear controlling element by reason of said lost motion connection, and whereby said handle may be disconnected from said sleeve when operation of said reverse gear controlling element is desired, and a relatively stationary cam acting automatically upon said latch to force it from said notch and disconnect the handle from said sleeve as the handle approaches the angular position in which said shaft becomes effective upon the reverse gear controlling element, said cam having a notch therein for engagement by said latch to hold the handle in an intermediate position in which it is both disconnected from said sleeve and ineffective upon said reverse gear controlling element.

19. In a reverse gear and clutch device, a clutch, a reverse gear controlling element, a shaft, an arm on said shaft having a lost motion connection to said reverse gear controlling element, a sleeve rotatable on said shaft and connected to said clutch mechanism for operation of the latter, said sleeve having a flange with a notch therein, a handle carried by said shaft, a latch carried by said handle and engageable in said notch to couple the sleeve to said handle, whereby operation of said handle will operate said sleeve and clutch while ineffective upon the reverse gear controlling element by reason of said lost motion connection, and whereby said handle may be disconnected from said sleeve when operation of said reverse gear controlling element is desired, a relatively stationary cam acting automatically upon said latch to force it from said notch and disconnect the handle from said sleeve as the handle approaches the angular position in which said shaft becomes effective upon the reverse gear controlling element, said cam being rotatable upon said sleeve, and means for adjustably anchoring said cam against angular movement from any adjusted position to which it may be moved, whereby the instant of disconnection of said handle from the sleeve may be varied.

20. In a reverse gear and clutch device, a clutch, a reverse gear controlling element, a shaft, an arm on said shaft having a lost motion connection to said reverse gear controlling element, a sleeve rotatable on said shaft and connected to said clutch mechanism for operation of the latter, said sleeve having a flange with a notch therein, a handle carried by said shaft, a latch carried by said handle and engageable in said notch to couple the sleeve to said handle, whereby operation of said handle will operate said sleeve and clutch while ineffective upon the reverse gear controlling element by reason of said lost motion connection, and whereby said handle may be disconnected from said sleeve when operation of said reverse gear controlling element by said handle is desired, and a relatively stationary cam acting automatically upon said latch to force it from said notch and disconnect the handle from said sleeve as the handle approaches the angular position in which said shaft becomes effective upon the reverse gear controlling element, said cam having a notch therein for engagement by said latch to hold the handle in an intermediate position in which it is disconnected from the sleeve and ineffective upon said reverse gear controlling element, said latch being spring actuated into said first notch when moved into alignment therewith and released by said cam.

21. In a reverse gear and clutch device, a shaft, a handle secured to said shaft for oscillating the same, a reverse gear controlling element, an arm on said shaft connected to said controlling element for operating the same, a clutch, a sleeve on said shaft having a projection connected to said clutch for operating the same, said sleeve having a flange adjacent the handle, the periphery of said flange having a notch therein, a spring pressed latch carried by said handle and normally riding upon the periphery of said flange and engageable in said notch automatically when brought into alignment therewith, and means for disengaging said latch from the notch to uncouple the handle and sleeve, whereby said reverse gear controlling element may be operated without operation of said clutch.

22. In a reverse gear and clutch device, a shaft, a handle secured to said shaft for oscillating the same, a reverse gear controlling element, an arm on said shaft connected to said controlling element for operating the same, a clutch, a sleeve on said shaft having a projection connected to said clutch for operating the same, said sleeve having a flange adjacent the handle, the periphery of said flange having a notch therein, a spring pressed latch carried by said handle and normally riding upon the periphery of said flange and engageable in said notch automatically when brought into alignment therewith, and a relatively stationary cam disposed in the path of travel of the latch for camming the latch out of the notch when the clutch operating sleeve has been operated in a given direction through a given extent.

23. In a reverse gear and clutch device, a shaft, a handle secured to said shaft for oscillating the same, a reverse gear controlling element, an arm on said shaft connected to said controlling element for operating the same, a clutch, a sleeve on said shaft having a projection connected to said clutch for operating the same, said sleeve having a flange adjacent the handle, the periphery of said flange having a notch therein, a spring pressed latch carried by said handle and normally riding upon the periphery of said flange and engageable in said notch automatically when brought into alignment therewith, and a relatively stationary cam disposed in the path of travel of the latch for camming the latch out of the notch when the clutch operating sleeve has been operated in a given direction through a given extent, said cam being adjustable in the path of travel of the latch for varying the instant in the angle of movement of the handle at which disengagement from the sleeve occurs.

24. In a reverse gear and clutch device, a shaft, a handle secured to said shaft for oscillating the same, a reverse gear controlling element, an arm on said shaft connected to said controlling element for operating the same, a clutch, a sleeve on said shaft having a projection connected to said clutch for operating the same, said sleeve having a flange adjacent the handle, the periphery of said flange having a notch therein, a spring pressed latch carried by said handle and normally riding upon the periphery of said flange and engageable in said notch automatically when brought into alignment therewith, and a relatively stationary cam disposed in the path of travel of the latch for camming the latch out of the notch when the clutch operating sleeve has been operated in a given direction through a given extent, said cam having a notch with which the latch engages after disengagement from the flange notch.

In witness whereof, I hereunto subscribe my signature.

WALTER L. WEEKS.